(12) United States Patent  
Bolz et al.

(10) Patent No.: US 9,202,303 B2  
(45) Date of Patent: Dec. 1, 2015

(54) SYSTEM AND METHOD FOR COMPOSITING PATH COLOR IN PATH RENDERING

(75) Inventors: Jeffrey A. Bolz, Austin, TX (US); Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 228 days.

(21) Appl. No.: 13/112,874

(22) Filed: May 20, 2011

(65) Prior Publication Data

US 2011/0285735 A1  Nov. 24, 2011

Related U.S. Application Data

(60) Provisional application No. 61/347,359, filed on May 21, 2010.

(51) Int. Cl.
```
G09G 5/00      (2006.01)
G06T 15/00     (2011.01)
G06T 11/20     (2006.01)
```

(52) U.S. Cl.  
CPC ............ *G06T 15/005* (2013.01); *G06T 11/203* (2013.01)

(58) Field of Classification Search  
None  
See application file for complete search history.

(56) References Cited

U.S. PATENT DOCUMENTS

| | | | |
|---|---|---|---|
| 6,008,820 A * | 12/1999 | Chauvin et al. | 345/502 |
| 6,697,063 B1 * | 2/2004 | Zhu | 345/421 |
| 6,891,533 B1 * | 5/2005 | Alcorn et al. | 345/419 |
| 6,970,175 B2 * | 11/2005 | Hawksworth | 345/589 |
| 7,113,183 B1 * | 9/2006 | Collins et al. | 345/419 |
| 7,184,040 B1 * | 2/2007 | Tzvetkov | 345/421 |
| 7,737,983 B2 * | 6/2010 | Brothers et al. | 345/522 |
| 2002/0194436 A1 * | 12/2002 | McKenney | 711/152 |
| 2003/0164842 A1 * | 9/2003 | Oberoi et al. | 345/629 |
| 2004/0233195 A1 * | 11/2004 | Bunnell | 345/426 |
| 2007/0013711 A1 * | 1/2007 | Asente et al. | 345/581 |
| 2007/0236498 A1 * | 10/2007 | Higuchi et al. | 345/441 |
| 2008/0018650 A1 * | 1/2008 | Sander | 345/441 |
| 2008/0198168 A1 * | 8/2008 | Jiao et al. | 345/506 |
| 2009/0019228 A1 * | 1/2009 | Brown et al. | 711/135 |
| 2010/0149181 A1 * | 6/2010 | Lee et al. | 345/423 |
| 2011/0018874 A1 * | 1/2011 | Hasselgren et al. | 345/420 |
| 2011/0090228 A1 * | 4/2011 | Persson | 345/443 |
| 2011/0267363 A1 * | 11/2011 | Miller et al. | 345/592 |

OTHER PUBLICATIONS

Wikipedia, Blend Modes.*

(Continued)

*Primary Examiner* — Stephen R Koziol  
*Assistant Examiner* — Jason Pringle-Parker  
(74) *Attorney, Agent, or Firm* — Artegis Law Group, LLP

(57) ABSTRACT

One embodiment of the present invention sets forth a technique for compositing a rendered path object into an image buffer. A shader program executing within a graphics processing unit (GPU) performs a stenciling operation for the path object and subsequently performs a texture barrier operation, which invalidates caches configured to store texture and frame buffer data within the GPU. The shader program then performs covering operation for the path object in which the shader renders color samples for the path object and composites the color samples into an image buffer. The shader program binds to the image buffer for access as both a texture map and a writeable image. Stencil values are reset when corresponding pixels are written once per path object, and texture caches are invalidated via the texture barrier operation, which is performed after each covering operation per path object.

24 Claims, 10 Drawing Sheets

(56) References Cited

OTHER PUBLICATIONS

Farouki, et al. "Algebraic properties of plane offset curves", Elsevier Science Publishers B.V. (North-Holland) 1990, pp. 101-127.

Warnock, et al. "A Device Independent Graphics Imaging Model for Use with Raster Devices", Computer Graphics vol. 16, No. 3, Jul. 1982, pp. 313-319.

Loop, et al. "Resolution Independent Curve Rendering using Programmable Graphics Hardware", Association for Computing Machinery, Inc., 2005, pp. 1000-1009.

Kokojima, et al. "Resolution Independent Rendering of Deformable Vector Objects using Graphics Hardware", Toshiba Corp. (email: yoshiyuki.kokojima@toshiba.co.jp), one page.

Rueda, et al. "GPU-based rendering of curved polygons using simplicial coverings" Elsevier Computers & Graphics Journal 32, 2008 pp. 581-588.

Non-Final Office Action dated Mar. 27, 2014, U.S. Appl. No. 13/107,698, 9 pages.

* cited by examiner

PRIOR ART

SYSTEM AND METHOD FOR COMPOSITING PATH COLOR IN PATH RENDERING

CROSS-REFERENCE TO RELATED APPLICATIONS

This application claims priority benefit to U.S. provisional patent application titled, "Path Rendering," filed on May 21, 2010 and having Ser. No. 61/347,359. This related application is also hereby incorporated by reference in its entirety.

BACKGROUND OF THE INVENTION

1. Field of the Invention

The present invention generally relates to graphics processing and more specifically to a system and method for compositing path color in path rendering.

2. Description of the Related Art

Path rendering is a style of resolution-independent two-dimensional (2D) rendering that is the basis for a number of important rendering standards such as PostScript, Java 2D, Apple's Quartz 2D, OpenVG, PDF, TrueType fonts, OpenType fonts, PostScript fonts, Scalable Vector Graphics (SVG) web format, Microsoft's Silverlight and Adobe Flash for interactive web experiences, Open XML Paper Specification (OpenXPS), drawings in Office file formats including PowerPoint, Adobe Illustrator illustrations, and more.

In the context of path rendering, the term resolution-independent means that an image is described by paths without regard to the pixel resolution of a resulting rendered image or associated frame buffer. This is in contrast to the resolution-dependent nature of bitmapped graphics, which is tied to a particular 2D image resolution. Unlike images specified by using bitmapped graphics, images specified with path rendering can be rendered at arbitrary resolutions or arbitrarily transformed without blurring or pixilation typically associated with such operations when performed on a bitmapped image.

Sometimes the term vector graphics is used to mean path rendering, but path rendering refers to a specific approach for rendering an image. While vector graphics could be any computer graphics approach that represents resolution-independent objects (typically 2D), path rendering is a much more specific rendering model with salient features that include path filling, path stroking, dashing, path masking, compositing, and path segments specified as Bèzier curves.

FIG. 1A is a prior art image specified by a sequence of paths for path rendering. Path rendering is analogous to how an artist draws with pens and brushes to sequentially compose an image. The path sequence defines a specific order for rendering the paths. Each path is specified as a sequence of path commands and a corresponding set of coordinates. Each path command may specify one or more sub-paths. Each sub-path (also called a trajectory) is a connected sequence of line segments and/or curved segments. Each sub-path may be closed, meaning the sub-path's start and terminal points are the same location so the stroke forms a loop; alternatively, a sub-path can be open, meaning the sub-path's start and terminal points are distinct. As shown, the paths are stroked but not filled.

FIG. 1B is the prior art image of FIG. 1A with both stroking and filling. As shown, a first path is stroked with black and filled with white, while a second path behind the first path is stroked with black and filled with gray. When a path is both filled and stroked, typically the stroking operation is done immediately subsequent to the filling operation so the stroking outlines the filled region. Artists tend to use stroking and filling together in this way to help highlight or offset the filled region so typically the stroking is done with a different color than the filling.

FIG. 1C illustrates the prior art image of FIG. 1A rendered with filling but without stroking. As shown, the first path is filled with white, while the second path behind the first path is filled with gray. Without stroking, the first path is only visible in this setting in that it covers portions of the second path with white.

Filling is similar to the way a child would "color in between the lines" of a coloring book. If a sub-path within a path is not closed when such a sub-path is filled, the standard practice is to force the sub-path closed by connecting its end and start points with an implicit line segment, thereby closing the sub-path, and then filling that resulting closed path. While the meaning of "inside a path" generally matches the intuitive meaning of this phrase, path rendering formalizes this notion with what is called a fill-rule. The intuitive sense of "inside" is sufficient as long as a closed sub-path does not self-intersect itself. However if a sub-path intersects itself or another sub-path or some sub-paths are fully contained within other sub-paths, what it means to be inside or outside the path needs to be better specified.

Stroking is distinct from filling and is analogous to tracing or outlining each sub-path comprising a path as if with a pen or marker defined by a certain width. Stroking operates on the perimeter or boundary defined by the path whereas filling operates on the path's interior. Unlike filling, there is no requirement for the sub-paths within a path to be closed for stroking. For example, the curve of a letter "S" could be stroked without having to be closed though the curve of the letter "O" could also be stroked.

A stroke for a path may be embellished using dashing that interrupts the stroke with gaps that are specified by a repeated pattern of on-off lengths, called a dash pattern. The dash pattern for a particular path may begin at an initial offset into the dash pattern other than zero; this offset is known as the dash offset. The dash offset essentially shifts the dash pattern up or down (if negative) the path. Each end of a dash may be specified by a certain form of cap, such as a flat or round cap. Dashing is common in technical illustration. Dashing is helpful in distinguishing different types of lines or connections. Artists also make use of dashing to accomplish various artistic effects.

FIG. 1D illustrates the prior art image of FIG. 1B, including dashed stroked paths for the second path.

Dashing curved paths is challenging because it requires the computation of incremental arc lengths along a dashed path. Computing the length of a cubic Bèzier segment or partial elliptical arc lacks a tractable closed form solution and is therefore extremely difficult. Closed form analytic equations for the arc lengths of cubic Bèzier segments and arcs limited to elementary functions do not exist.

Graphics processing units (GPUs) conventionally include features to accelerate three-dimensional (3D) graphics and certain 2D bitmapped graphics functions. GPUs provide extremely high-throughput processing for certain classes of computations compared to a traditional central processing unit (CPU). In today's systems, however, nearly all path rendering is performed by the CPU via scan-line rendering with no acceleration by a GPU. GPUs do not conventionally render curved primitives as a native rendering operation, so path rendering primitives such as Bèzier segments and partial elliptical arcs must be approximated by lots of tiny triangles for a GPU to render such curve primitives. Constructing the required tessellations of a path that is approximated by many short connected line segments. This process can create a substantial CPU burden. The triangles or other polygons resulting from tessellation are then rendered by the GPU. Because GPUs are so fast at rasterizing triangles, tessellating paths into polygons that can then be rendered by GPUs is an obvious approach to GPU-accelerating path rendering.

Tessellation is a fragile, often quite sequential, process that requires global inspection of the entire path. Tessellation depends on dynamic data structures to sort, search, and otherwise manipulate the incremental steps involved in generating a tessellation for a path. Path rendering makes this process considerably more difficult by permitting curved path segments as well as allowing path segments to self-intersect, form high genus topologies, and be unbounded in size. Performance burdens associated with complex CPU-based tessellation for GPU-based rendering can result in poor overall performance.

A general problem with using a GPU to render paths is unacceptably poor antialiasing quality when compared to standard CPU-based methods. The problem is that GPUs employ point sampling for rasterization of triangular primitives with only 1 to 8 samples (often 4) per pixel. CPU-based scan-line methods typically employ 16 or more samples per pixel and can accumulate coverage over horizontal spans for higher-quality antialiasing.

Animating or editing paths is costly because it requires re-tessellating the entire path since the tessellation is resolution and view dependent, and in general it is very difficult to prove a local edit to a path will not cause a global change in the tessellation of the path. Furthermore, when curved path segments are present and the scaling of the path with respect to pixel space changes appreciably (zooming in say), the curved path segments may need to be re-subdivided and re-tessellation is likely to be necessary.

Additionally, compositing in path rendering systems typically requires that pixels rasterized by a filled or stroked path are updated once-and-only-once per rasterization of the path. In particular, compositing of a path with an image buffer must be performed once-and-only-once for each image sample covered by the path. This requirement means non-overlapping tessellations are required. So for example, a cross cannot be tessellated as two overlapping rectangles but rather must be rendered by the outline of the cross, introducing additional vertices and primitives. In particular, this means the sub-paths of a path cannot be processed separately without first determining that no two sub-paths overlap. These requirements, combined with the generally fragile and sequential nature of tessellation algorithms make path tessellation particularly expensive. Because of the expense required in generating tessellations, it is very tempting and pragmatic to cache tessellations. Unfortunately such tessellations are much less compact than the original path representations, particularly when curved path segments are involved. Consequently, a greater amount of data must be stored to cache paths after tessellation compared with storing the paths prior to tessellation. Cached tessellations are also ineffective when paths are animated or rendered just once.

Conventional stroking can be performed by approximating paths into sub-pixel linear segments and then tracing the segments with a circle having a diameter equal to a stroke width. Offset curves are generated at the boundary of the stroked path. These offset curves are typically of much higher degree of complexity compared with the linear segments that are traced to generate the stroked path. Determining whether or not each pixel is inside or outside of a stroked path to generate a given stroke is mathematically complex. Identification of the pixels to be stroked is equivalent to identifying pixels that are within half of the stroke width of any point along the path to be stroked. More specifically, the pixels to be stroked are within half of the stroke width measured along a line that is perpendicular to the tangent of the path segment being stroked.

The tangent of a sub-path is not necessarily well-defined at junctions between path segments. So additional rules are needed to determine what happens at and in the vicinity of such junctions as well as what happens at the terminal (start and end) points of sub-paths. Therefore stroking specifies further stroking rules to handle these situations.

In standard path rendering systems, paths are specified as a sequence of cubic and quadratic (non-rational) Bèzier curve segments, partial elliptical arcs, and line segments. While more mathematically complex path segments representations could be used to specify paths, in practice, existing standards limit themselves to the aforementioned path segment types.

Path filling and stroking use the same underlying path specification. For filling, this means the resulting piece-wise boundaries to be filled may be up to third-order (in the case of cubic Bèzier segments) or rational second-order (in the case of partial elliptical arcs). Filling these curved boundaries of Bèzier curves and arcs is clearly more complex than filling the standard polygonal primitives in conventional polygonal 2D or 3D rendering where the boundaries (edges) of the polygonal primitives (usually triangles) are all first-order, being linear segments, and often required to be convex. Filling and stroking operations on the curves and arcs are also more complex than conventional line and convex polygon rasterization because paths are unbounded in their complexity whereas line segments and triangles are defined by just 2 or 3 points respectively. A path may contain just a single path segment or it could contain thousands or more.

The boundaries of stroked paths are actually substantially higher order than the third-order segments. The offset curve of non-rational (second-order) quadratic and (third-order) Bèzier curves are eighth- and tenth-order curves respectively. This high order makes exact determination and evaluation of the resulting offset curves for such Bèzier segments intractable for use in direct rendering. In other words, it is quite unreasonable to try to determine exactly the boundary representation of such offset curves and then simply fill them. For this reason, various techniques have been developed to approximate offset curves with sequences of Bèzier, arc, or line segments. These approximate stroke boundaries may then be filled using significantly less complex techniques.

Certain functions within a GPU are highly programmable and can execute arbitrary algorithms, while other functions are fixed or may have very limited programmability. Conventional GPU-based compositing functions that operate on image buffers generally comprise fixed function processing units with limited programmability. However, path rendering typically requires complex compositing operations that are outside the scope and flexibility of conventional GPU compositing functions.

Path rendering incorporates a more sophisticated compositing model than is standard in the blending functionality of 3D standards and implemented in modern GPUs. Path rendering includes compositing operations (known as blend modes) such as "linear dodge" that cannot be mapped by to the blending functionality of standard 3D programming interfaces because these compositing operations exceed the limited computational resources provisioned for standard 3D blending. Providing this sophisticated compositing functionality is further complicated by the path rendering requirement for once-and-only-once update of image samples covered by a path. While sophisticated compositing functionality could potentially be performed by more general-purpose programmable shaders in modern GPUs, various caches and read-modify-write hazards within the GPU's execution pipeline make this approach unreliable and/or inefficient.

GPU acceleration can provide a significant performance improvement for certain graphics applications, such as 3D rendering and 2D image processing. However, for the reasons described above, path rendering in the prior art does not benefit as significantly from GPU involvement. Accordingly, what is needed in the art is an improved system and method for performing compositing functions in GPU-based path rendering.

SUMMARY OF THE INVENTION

One embodiment of the present invention sets forth a technique for rendering a path object. The technique involves performing a stenciling operation on the path object to update one or more stencil values associated with at least one pixel that is associated with the path object, executing a texture barrier operation to invalidate one or more caches configured to store an image buffer, performing a covering operation on the path object to composite a rendered pixel value for the at least one pixel, based on the one or more stencil values, and writing the rendered pixel value to the image buffer.

Further embodiments of the present invention include, without limitation, a non-transitory computer-readable storage medium that includes instructions that enable a processing unit to implement one or more aspects of the above methods as well as a computer system configured to implement one or more aspects of the above methods.

One advantage of the disclosed technique is that fully programmable compositing is enabled within a conventional GPU. Fully programmable compositing enables the GPU to perform a complete set of compositing operations required by existing path rendering blend mode standards.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1A:
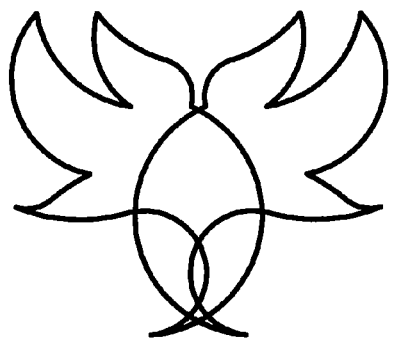
FIG. 1A is a prior art image specified by a sequence of paths for path rendering.
Figure 1B:
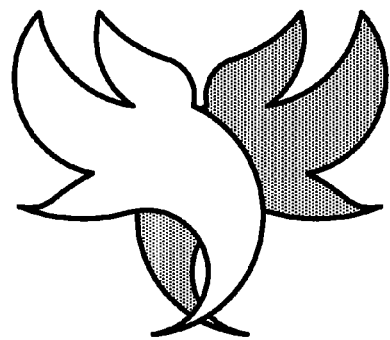
FIG. 1B is the prior art image of FIG. 1A with both stroking and filling.
Figure 1C:
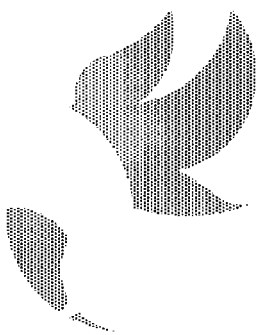
FIG. 1C illustrates the prior art image of FIG. 1A rendered with filling but without stroking.
Figure 1D:
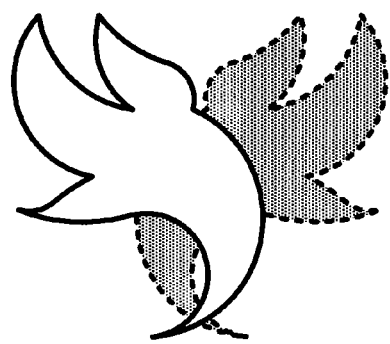
FIG. 1D illustrates the prior art image of FIG. 1B, including dashed stroked paths for the second path.
Figure 2A:
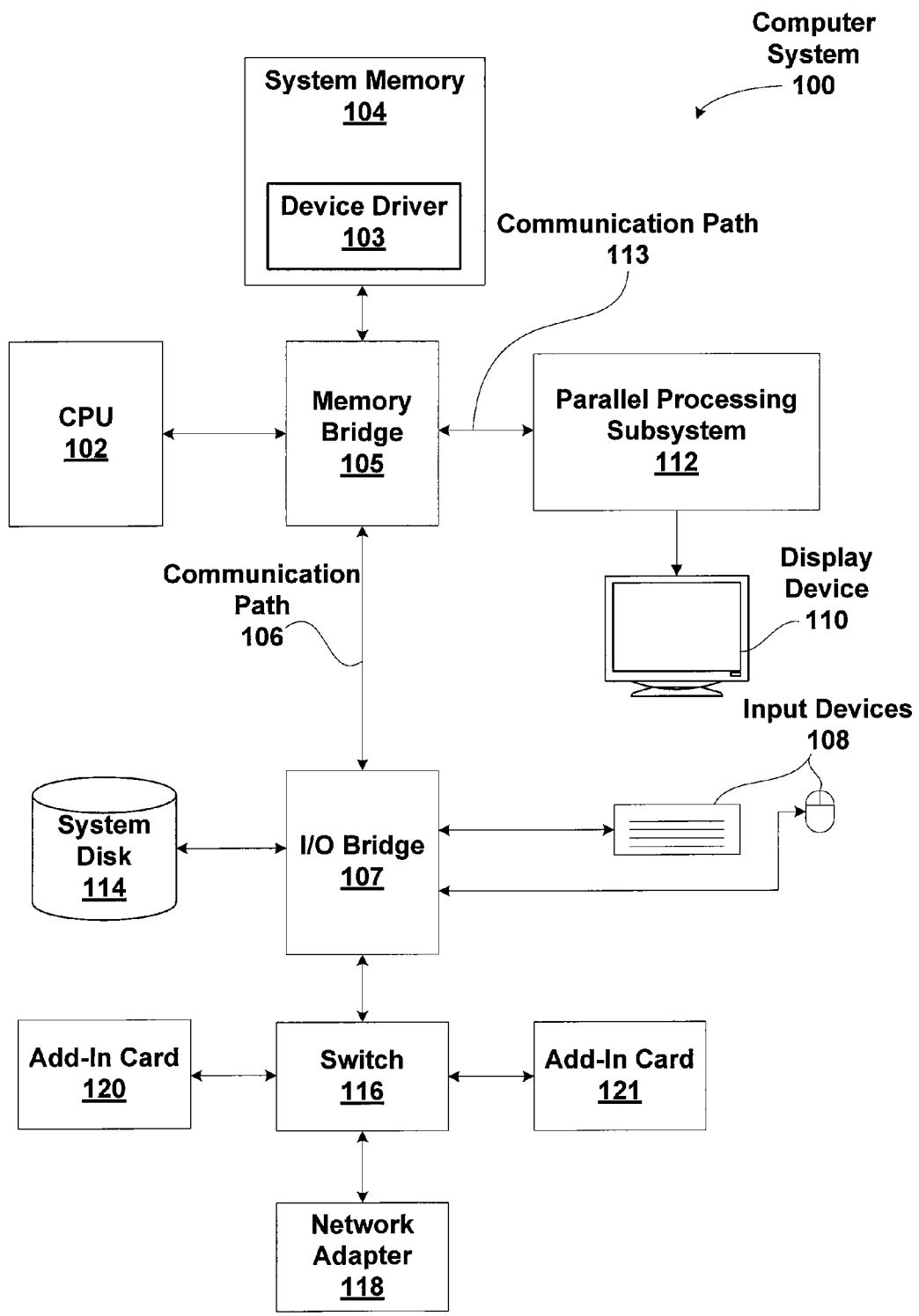
FIG. 2A is a block diagram illustrating a computer system configured to implement one or more aspects of the present invention.

FIG. 2A is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 2A may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2B:
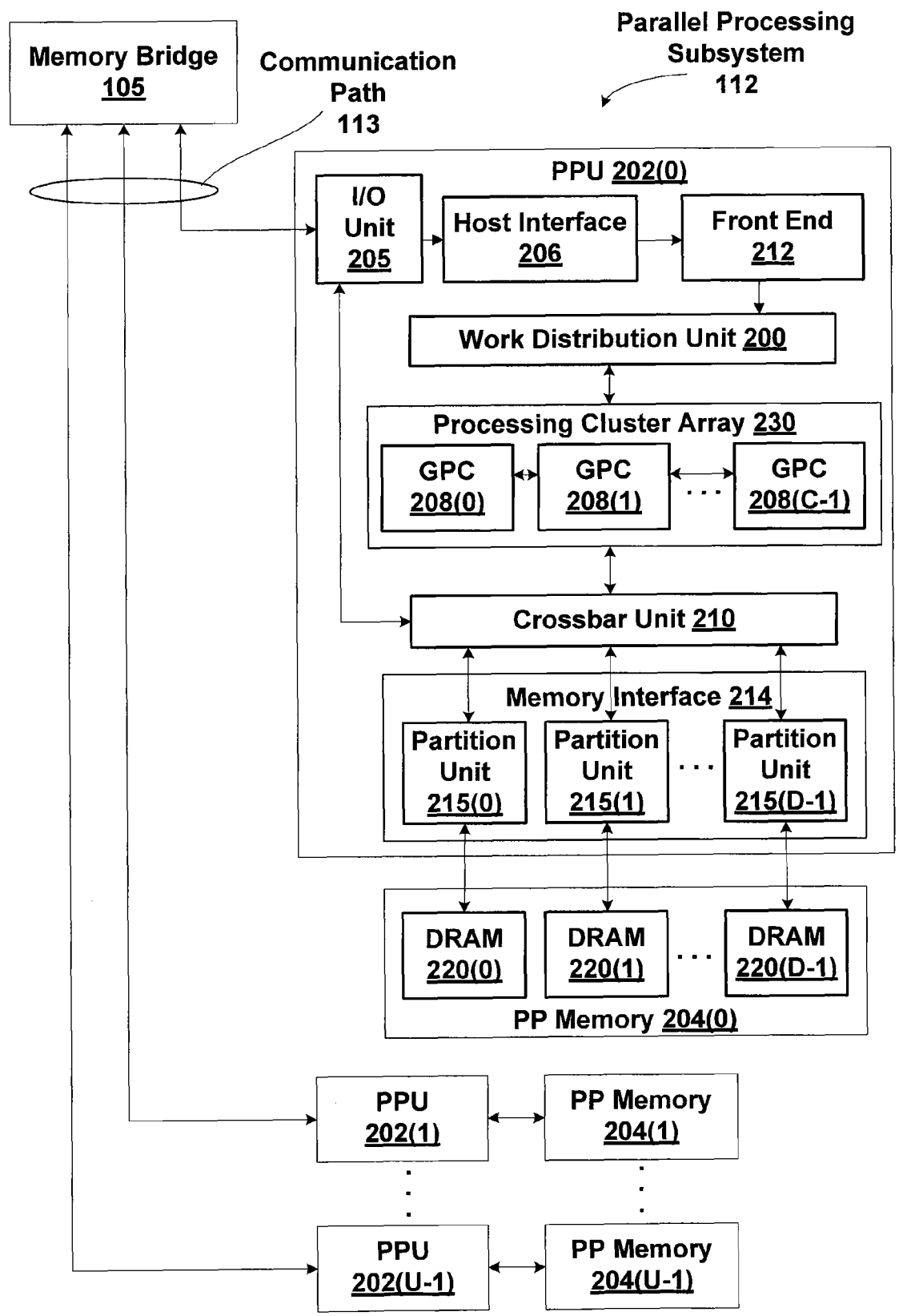
FIG. 2B is a block diagram of a parallel processing subsystem for the computer system of FIG. 2A, according to one embodiment of the present invention.

FIG. 2B illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 2A, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and communications path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 2A or FIG. 2B) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2B, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform patch tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2B, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
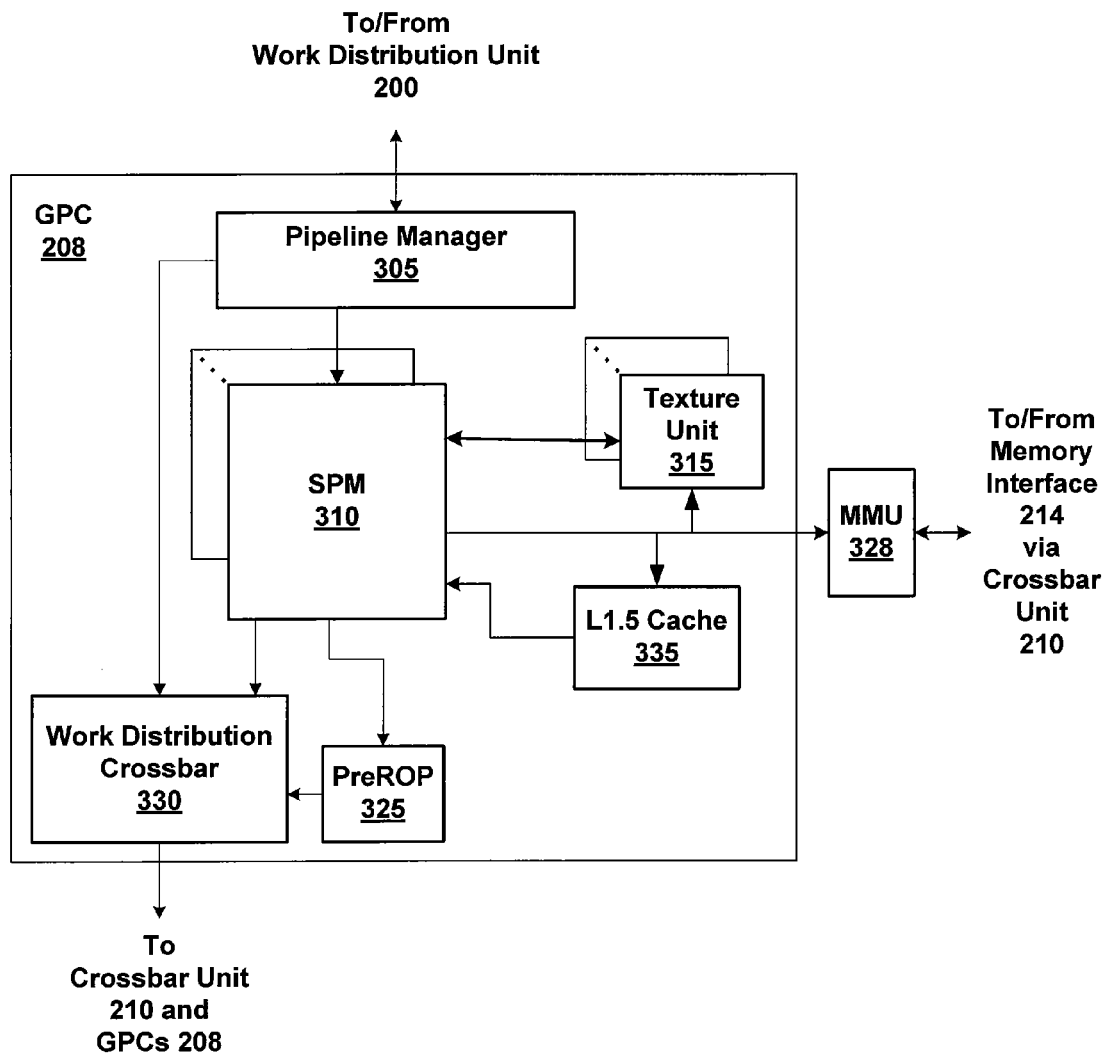
FIG. 3A is a block diagram of a GPC within one of the PPUs of FIG. 2B, according to one embodiment of the present invention.

FIG. 3A is a block diagram of a GPC 208 within one of the PPUs 202 of FIG. 2B, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., execution units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
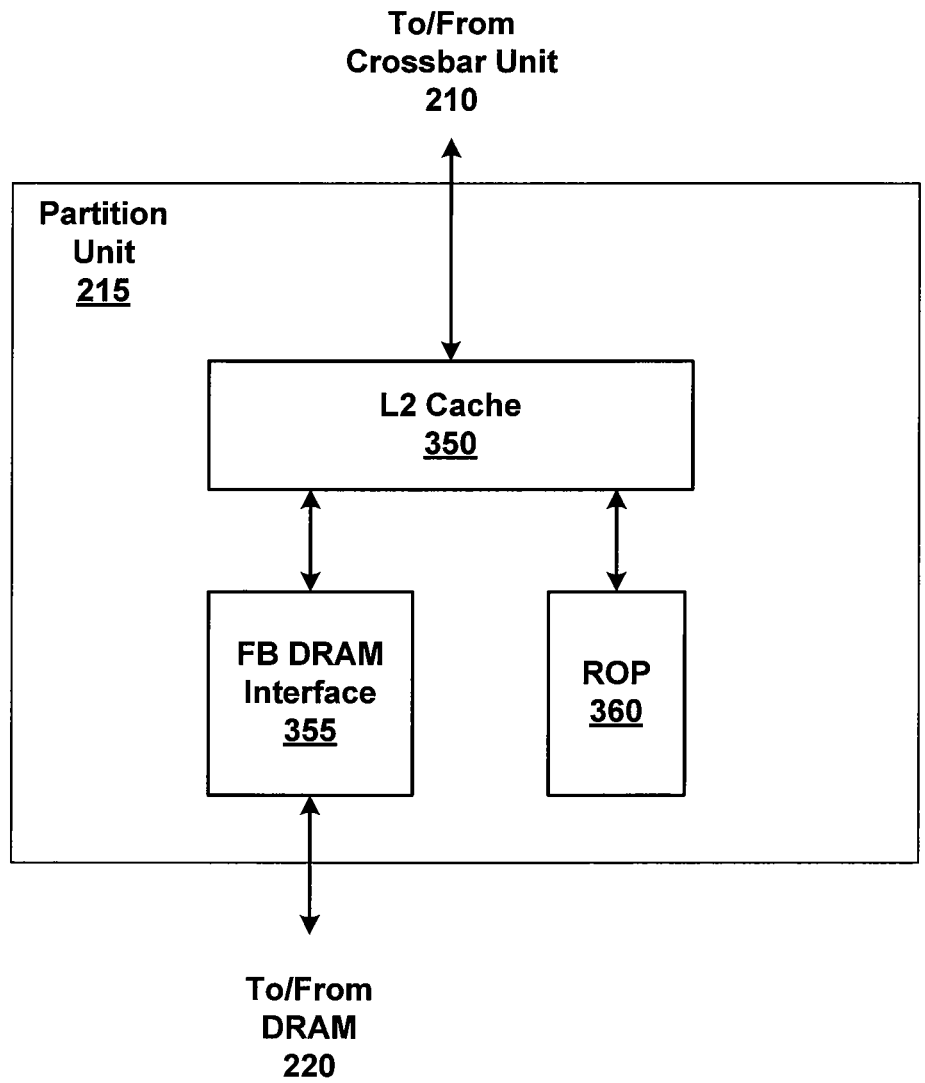
FIG. 3B is a block diagram of a partition unit within one of the PPUs of FIG. 2B, according to one embodiment of the present invention.

FIG. 3B is a block diagram of a partition unit 215 within one of the PPUs 202 of FIG. 2B, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 2A, 2B, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
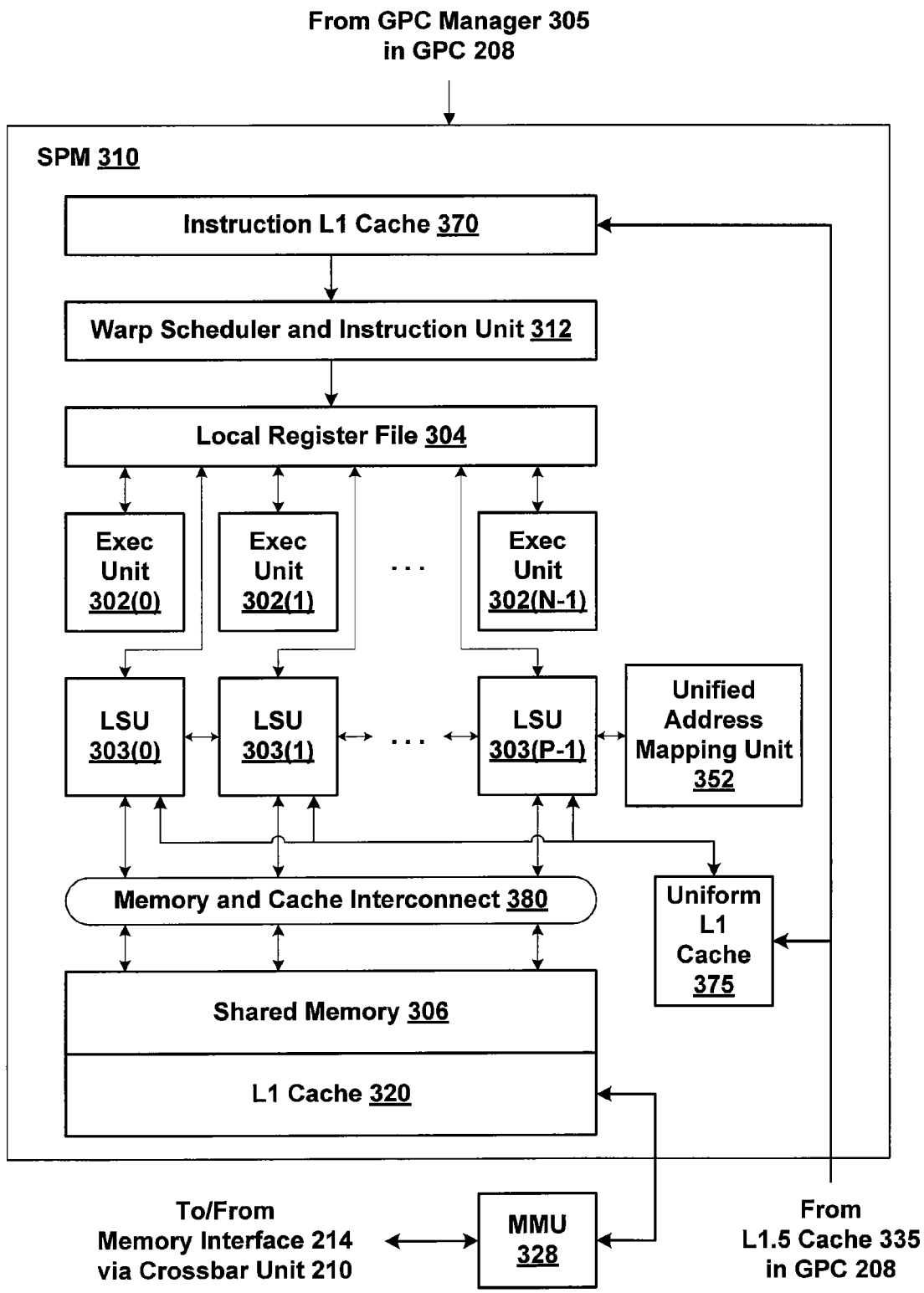
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Figure 4:
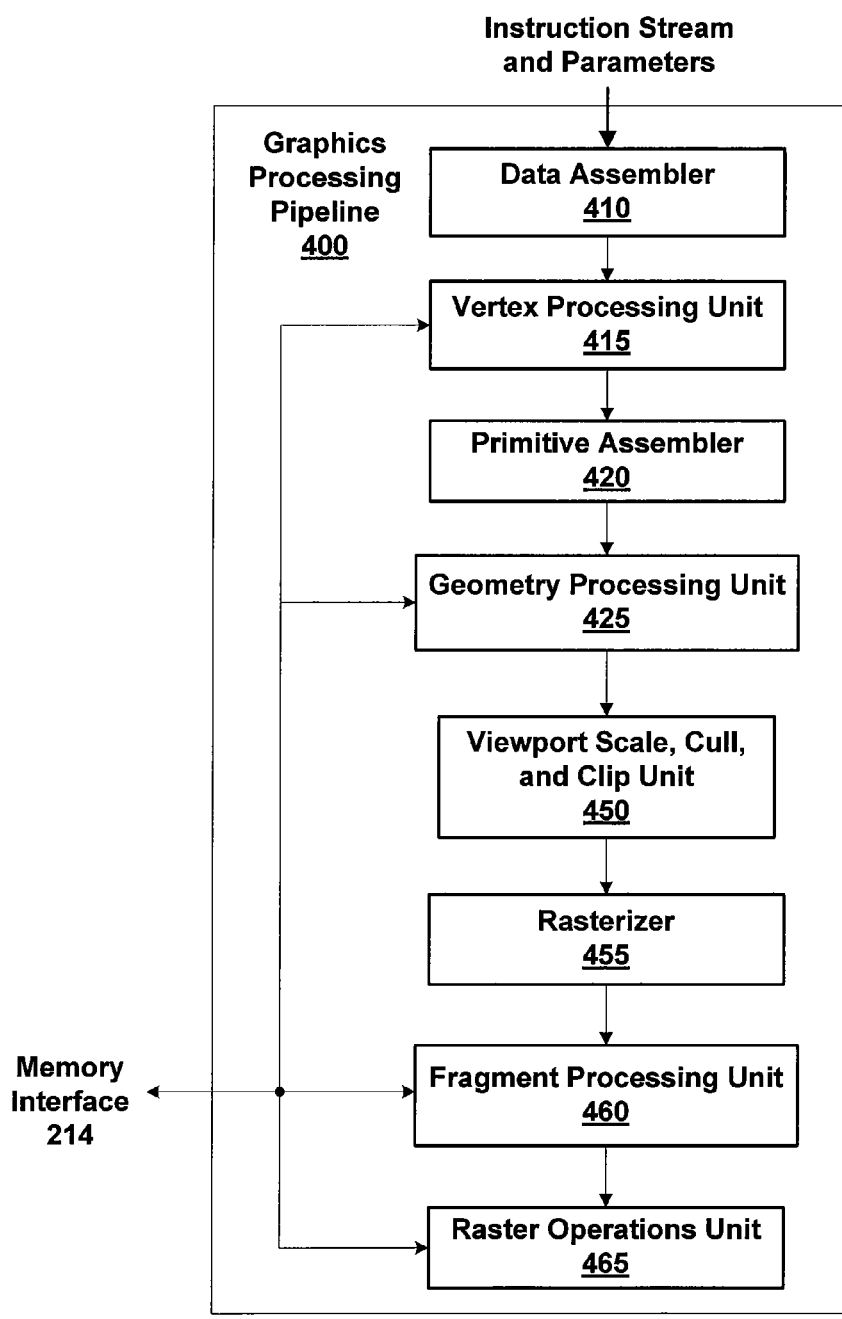
FIG. 4 is a conceptual diagram of a graphics processing pipeline that one or more of the PPUs of FIG. 2B can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Decomposing Path Objects

Path objects may be used to compose a path object scene, characterized as being a resolution-independent image. Each path object within the path object scene may specify a very complex geometry, with potentially overlapping stokes and complex fill geometry. Path objects are conventionally rendered on a general-purpose CPU, where highly complex rendering algorithms may be readily performed. While CPU-based rendering is able to cope with arbitrary complexity associated with certain path objects, CPU-based path object rendering does not leverage high-throughput processing capacity available on a typical GPU. The GPU can easily process a high volume of simple, parallel computations, but is not able to efficiently process the highly serial or highly complex algorithms that are typically associated with path object rendering.

Embodiments of the present invention set forth a technique for decomposition of an arbitrarily complex path object comprising an arbitrary number of path commands into a decomposed path object comprising simple stencil and cover operations that are easily processed by a GPU. The path commands are generally associated with either stroking operations or filling operations. Stroking and filling operations are each rendered in two phases. The first phase involves stenciling, which establishes geometric coverage, down to a sub-pixel resolution, for the path object. The second phase involves covering, which involves computing a color for the covered regions. Compositing operations occur during this second covering phase. A given path object may be specified as a combination of both stroking and filling path objects, which are typically rendered one after the other. A stroking path object typically includes certain details such as a dash pattern and a dash end specification.

The process of applying decomposition operators to a scene comprising path objects into simple stencil and cover operations for rendering on a GPU is referred to herein as "baking" the scene. The simple stencil operators and fill operators comprise a "baked representation" of the scene. Specific types of simple stencil operators and simple fill operators are selected for efficient rendering on a particular GPU. Importantly, the simple stencil operators and simple fill operators of the baked representation comprise resolution-independent geometric specifications for corresponding resolution-independent path objects. Certain exemplary decomposition operations are described below in conjunction with the present invention for baking a path object scene. However, any technically feasible techniques for decomposing a path object into a baked representation for efficient rendering on a GPU may be implemented without departing the scope and spirit of the present invention. A scene may be re-baked to accommodate changes within the scene.

A technique for efficiently evaluating an implicit representation of cubic Bèzier segments for filling an object path is described in U.S. patent application Ser. No. 13/097,483 filed Apr. 29, 2011, and entitled "Decomposing Cubic Bèzier segments for Tessellation-Free Stencil Filling." This related application is also hereby incorporated by reference in its entirety.

This technique describes a path as consisting of a sequence of connected path segment commands for line segments, Bèzier segments, and partial elliptical arcs. Cubic Bèzier segments pose a particular challenge when rendering these segments into the stencil buffer to determine what framebuffer sample locations are within the filled region of the respective path. If not done carefully, multiple classes of cubic Bèzier segments can contribute incorrect winding number offsets to the net winding number for a particular framebuffer sample location. An incorrect winding number determination immediately leads to an incorrect determination of a rasterized filled region of said path. Decomposing each arbitrary cubic Bèzier in a path into one or more simple cubic Bèzier segments produces a geometry set that is suitable for rendering filled paths containing cubic Bèzier segments. Such decomposition is beneficial because it results in a robust determination of the filled region of a rendered path without tessellating the path. The path is divided into cubic Bèzier path segments that are each classified and further divided into simple cubic Bèzier path segments. Care must be taken to preserve the proper vertex winding order of each simple Bèzier cubic segment, split the original cubic Bèzier at the proper positions, and linearly interpolate texture coordinates according to the technique described by Loop and Blinn for use with a discard shader. The simple cubic Bèzier path segments are then rasterized using a discard shader program to generate a stencil buffer indicating pixels that are inside of the path. In contrast, the discard shader technique described by Loop and Blinn fills the inside of the path by rendering the tessellated Bèzier curve segments using the discard shader to write directly to the image buffer.

Bèzier curves are defined by their control points. In the 2D content of path rendering, each control point is a 2D position. Curved path segments for a path may be generated by path commands for quadratic Bèzier curves, cubic Bèzier curves, and partial elliptical arcs.

A quadratic Bèzier curve is specified by 3 control points and a cubic Bèzier curve is specified by 4 control points. The QuadraticTo command uses the terminal position of the prior command as its initial control point (x0,y0) and then 4 associated coordinates form the two new (x1,y1) and (x2,y2) control points. The quadratic Bèzier curve starts at (x0,y0) heading towards (x1,y1) and ends at (x2,y2) as if coming from (x1,y1). Despite (x1,y1) providing the initial tangent direction when starting from (x0,y0) and terminating at (x2,y2), the resulting curve does not pass through (x1,y1); for this reason, (x1,y1) is known as an extrapolating control point while (x0,y0) and (x2,y2) are known as interpolating control points. Quadratic Bèzier curves may be filled without tessellation manner, because non-degenerate quadratic Bèzier curves have no points of self-intersection and the segment curve does not intersect the line formed by the initial and terminal control points.

The CubicTo command is similar to the QuadraticTo command but generates a cubic Bèzier curve. Such a curve is specified by 4 control points. The CubicTo command uses the terminal position of the prior command as its initial control point (x0,y0) and then 6 associated coordinates form the 3 new (x1,y1), (x2,y2), and (x3,y3) control points. The cubic Bèzier curve starts at (x0,y0) heading towards (x1,y1) and ends at (x3,y3) as if coming from (x2,y2). While a quadratic Bèzier curve has a single extrapolating control point, cubic Bèzier curves have two extrapolating control points, (x1,y1) and (x2,y2). A cubic Bèzier curve has the freedom, unlike a quadratic Bèzier curve, to specify arbitrary initial and terminal tangent directions for its end-points. This control makes cubic Bèzier curves popular with artists. This additional control comes from the curve being described by a third-order polynomial equation instead of a second-order equation in the case of a quadratic Bèzier curve (and first-order in the case of line segments). This additional polynomial degree provides the requisite freedom for a cubic Bèzier segment to non-trivially self-intersect itself or cross the line formed by the segment's initial and terminal control points. These conditions result in reversals of the local sense of "inside" and "outside" the path. In order for a tessellation-free path filling approach based on stencil counting of rasterized polygons to be robust when a discard shader is used to write a stencil buffer, such situations must be avoided.

A technique for stroking a path object based on quadratic Bèzier segments is described in U.S. patent application Ser. No. 13/097,993 0 filed Apr. 29, 2011, and titled "Point Containment for Quadratic Bèzier Strokes." This related application is also hereby incorporated by reference in its entirety.

The resulting quadratic Bèzier segments from this technique comprise a geometry set that is suitable for stroking rendered paths containing higher-order Bèzier segments, such as cubic Bèzier segments, without tessellating the path into polygons. The path is divided into quadratic Bèzier path segments, arcs, and/or line segments.

This technique described path stroking as having an associated "stroke width" that defines a region that is included in the stroke when a circle having a diameter of the stroke width is moved along the path segment. The path segment is considered a generating curve and the circle generates an inside offset curve and an outside offset curve as the circle moves along the path segment. Mathematical computation of the boundary of such offset curves is difficult. Because stroking is an important operation for many application programs that produce 2D images, it is desirable to accelerate stroking operations.

In one embodiment, a GPU, such as the PPU 202, may be used to perform functions to accelerate stroking operations. Importantly, tessellation of the path segments is avoided. Instead, a path is decomposed into quadratic Bèzier path segments or segments of lower complexity, e.g., arcs, line segments, and the like. The stroking operations are accelerated without determining or even approximating the boundary of the strokes (the inside and outside offset curves) that can be defined by high-order polynomials. Instead, computations are performed to determine whether or not discrete point locations are inside or outside of a particular quadratic Bèzier stroke or stroke of lower complexity.

A technique for decomposing a path into quadratic Bèzier segments is described in U.S. patent application Ser. No. 13/098,102 filed Apr. 29, 2011, and titled "Approximation of Stroked Higher-Order Curved Segments by Quadratic Bèzier Curve Segments." This related application is also hereby incorporated by reference in its entirety.

The resulting quadratic Bèzier segments from this technique comprise a geometry set that is suitable for stroking rendered paths containing higher-order Bèzier segments, such as cubic Bèzier segments, without tessellating the path into polygons. The path is divided into quadratic Bèzier path segments, arcs, and/or line segments. The quadratic Bèzier path segments generated by this decomposition technique are then processed to determine whether or not points are contained within the stroke region of each quadratic Bèzier path segment, arc, or line segment.

GPU-accelerated stroking techniques typically perform approximately 1 to 2 orders of magnitude more fragment processing operations per sample than filling of the paths. This relative expense is justified because it results in fewer approximations and a more compact and resolution-independent baked representation from which to render stroked paths. The observation that more rendered pixels are filled than stroked in typical path rendering scenes with both types of path rendering also helps balance the relatively higher per-sample cost of stroking to filling.

Decomposing stroking objects with dashing is described in U.S. patent application Ser. No. 13/098,147 filed Apr. 29, 2011, and titled "Conversion of Dashed Strokes into Quadratic Bèzier Segments Sequences." This related application is also hereby incorporated by reference in its entirety.

The quadratic Bèzier path segments, arcs, and line segments generated by the decomposition technique are then processed to determine whether or not points are contained within the stroke region of each quadratic Bèzier path segment, arc, or line segment.

Dashing is a standard embellishment to stroking whereby the stroke is dividing up into multiple sub-strokes based on an on-off pattern known as the dash pattern of the stroke. Path rendering standards supporting dashing include PostScript, Portable Document Format (PDF), Open XML Paper Specification (OpenXPS), SVG, and OpenVG. The dash pattern is an array of lengths specified in path-space units. For example, a dash pattern [4, 3, 2, 7] is 4 arc lengths on, 3 arc lengths off, 2 arc lengths on, 7 arc lengths off, repeated. If the dash pattern has an odd number of elements, the effective dash pattern is repeated twice to ensure the effective dash pattern always has an even number of elements.

Alternating elements of the dash pattern are arc lengths that specify how long to "dash on" and "dash off" the stroked curve; the dash pattern is initially on. When stroking a path, an additional scalar dash offset parameter indicates how many path-space units into the dash pattern the stroke begins, i.e., dash offset is an offset into the dash pattern. Another scalar dash phase parameter may also be specified that indicates if the subpaths restart at the dash offset or at a particular phase of the dash offset. A subpath is a connected set of path segments; a new subpath is initiated by a MoveTo command in the path's command sequence is encountered. Intuitively, a MoveTo command is similar to an artist picking up the pen and moving to a new 2D position on the page. So the dash phase indicates whether the dash pattern restarts for disconnected segments of a stroked path or not. An end-cap style indicates what happens at the end points of open (non-closed) sub-paths. Typical end-cap styles are round, square, none, and triangle. If the sub-path is closed, the join style is used to connect the initial and terminal segments rather than using end caps. When dashing, the ends of dashed stroked segments may have a capping style distinct from the end caps of each stroked subpath; in this case, these caps are referred to as dash caps.

In one embodiment, a GPU, such as the PPU 202, may be used to perform functions to accelerate the above operations. Importantly, tessellation of the path segments is avoided. Instead, a path is decomposed into quadratic Bèzier path segments or segments of lower complexity, e.g., arcs, line segments, and the like. Path decomposition results in fewer approximations and a more compact and resolution-independent baked representation from which to render stroked paths compared with tessellation of the path. Persons skilled in the art will recognize that, in addition to the above techniques, other decomposition techniques may be implemented in conjunction with path object baking without departing the scope and spirit of the present invention.

Baking Path Objects

Path objects typically comprise complex shapes described by complex mathematical models, as described above. In one embodiment of the present invention, each path object within a path object scene is decomposed or "baked" into substantially equivalent decomposed path objects that are simpler to render. Each decomposed path object may represent a portion of an original path object, and a collection of decomposed path objects may together represent the whole original path object. Both the original path object and decomposed path objects are resolution independent. However, the decomposed path objects comprise simpler mathematical models that may be efficiently rendered on a GPU.

Figure 5:
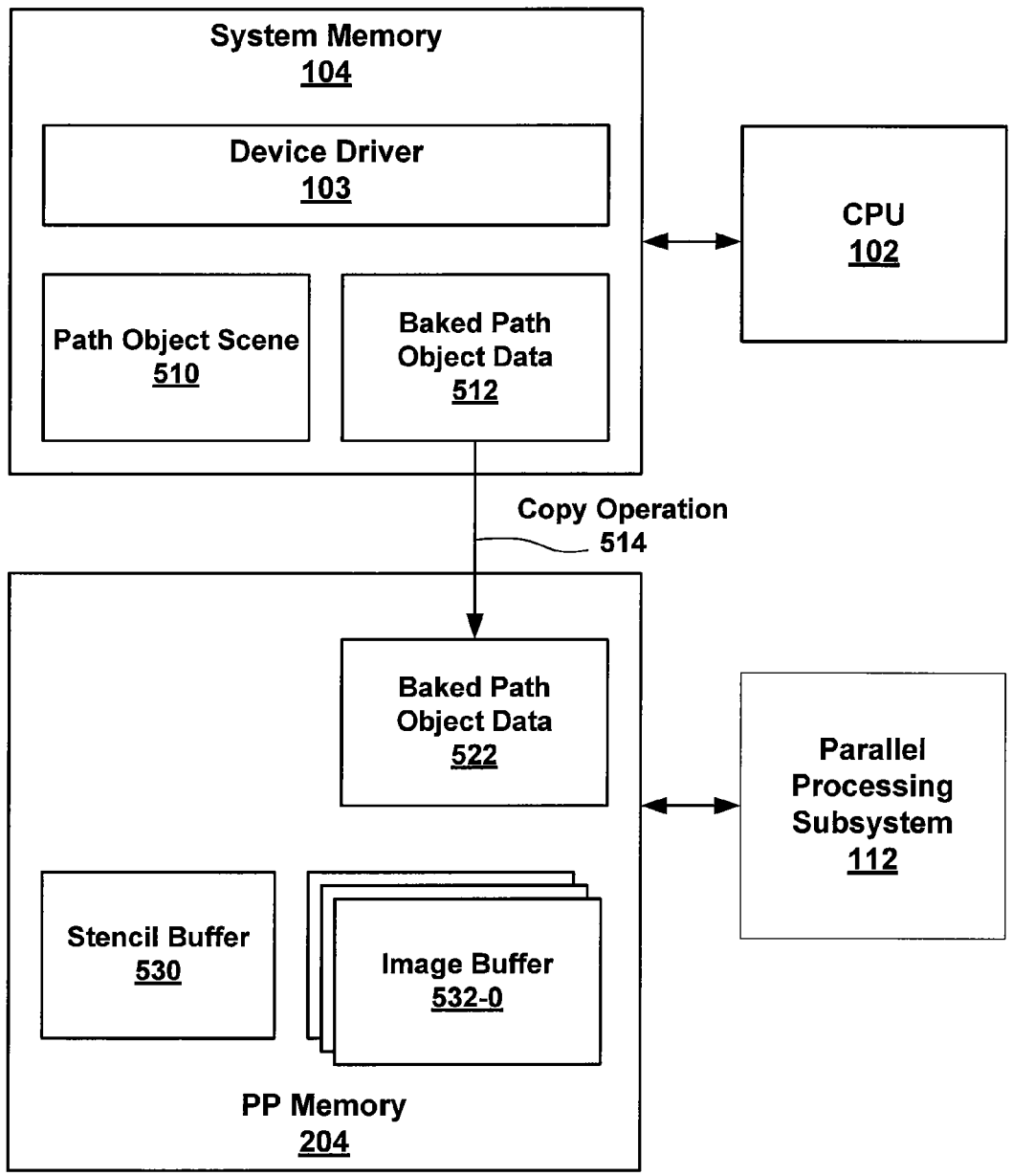
FIG. 5 is a detail of the computer system illustrating system elements for baking and rendering path object scene data, according to one embodiment of the present invention.

FIG. 5 is a detail of the computer system 100 of FIG. 2A illustrating system elements for baking and rendering path object scene data 510, according to one embodiment of the invention. The device driver 103 is configured to execute on the CPU 102 to bake a path object scene 510 into corresponding baked path object data 512. In alternative embodiments, a module within an application or a module within a library associated with the application bakes the path object scene 510 into corresponding baked path object data 512.

The path object scene 510 may comprise high-order path objects for stroking, filling, and dashing. The baked path object data 512 comprises only simple stencil and cover operations suitable for efficient execution on a GPU. In one embodiment, the GPU comprises the parallel processing subsystem 112. Specific types of simple stencil and cover operations are implementation specific for a given GPU.

In one embodiment, an application programming interface (API) specifies associated path objects that should be baked for rendering on the GPU. For example, an extension to the industry standard OpenGL API may specify a set of API calls for specifying path objects, and parameters for the path objects. Such API calls may include, for example, MoveTo, LineTo and QuadraticTo commands, which set a point location, draw a line, draw a quadratic curve, respectively. An additional API call may be implemented for triggering a baking operation on a group of path objects or baking may occur implicitly as a consequence of rendering. The API should facilitate specification of any relevant aspect of a path object. For example, the API should facilitate specification of object types and coordinates for control points. The API should include parameters for end cap styles, join styles, miter limits, dash arrays, dash offsets, a default radius value, a default fill rule, fill stroke usage, and the like. Internal state for the device driver 103 should include a private buffer for object state, including vertex attributes, constants, shaders, and pre-computed push-buffer commands for organizing GPU-bound commands.

After the path object scene 510 is baked for GPU rendering, the corresponding baked path object data 512 is copied to PP memory 204 via copy operation 514 as baked path object data 522. Copying to PP memory 204 is advantageous because of the relative bandwidth and speed with which a PPU 202 performing path rendering can access this memory. In alternative embodiments, the baked path object data 522 may be copied to alternate memories that are also accessible to the PPU 202. The parallel processing subsystem 112 renders the baked path object data 522 to a stencil buffer 530 in a stenciling phase. The parallel processing subsystem 112 then renders the baked path object data 522 to an image buffer 532 in a cover phase, with geometric coverage determined by the stencil buffer 530. In a conventional 3D graphics system, a depth buffer comprising three bytes per pixel and one stencil sample per pixel may be allocated and associated with an image buffer of equivalent pixel count. Such an allocation scheme is inefficient for path rendering because depth is typically not used in computing visibility of path objects, although the only format for allocating a stencil buffer is in conjunction with a larger depth buffer. Embodiments of the present invention enable allocation of a pure stencil buffer, such as stencil buffer 530.

As previously discussed, the GPU renders the baked data in two phases. During the stenciling phase, the GPU is configured for pass-through vertex processing, with clip coordinates generated based on clip enables. Geometry and tessellation shaders are disabled and fragment shaders are selected based on each topology state within the path being rendered. Front and back polygon fill modes are set to the known state of GL_FILL. Furthermore, color and depth writes are disabled. During stenciling, stencil state is over-written with path stenciling parameters.

During the covering phase, the GPU is configured for pass-through vertex processing, with clip coordinates generated based on clip enables. Geometry and tessellation shaders are disabled. Front and back polygon fill modes are set to the known state of GL_FILL. During covering, the stencil state and the color and depth write masks are preserved.

Shader Program-based Compositing

Figure 6:
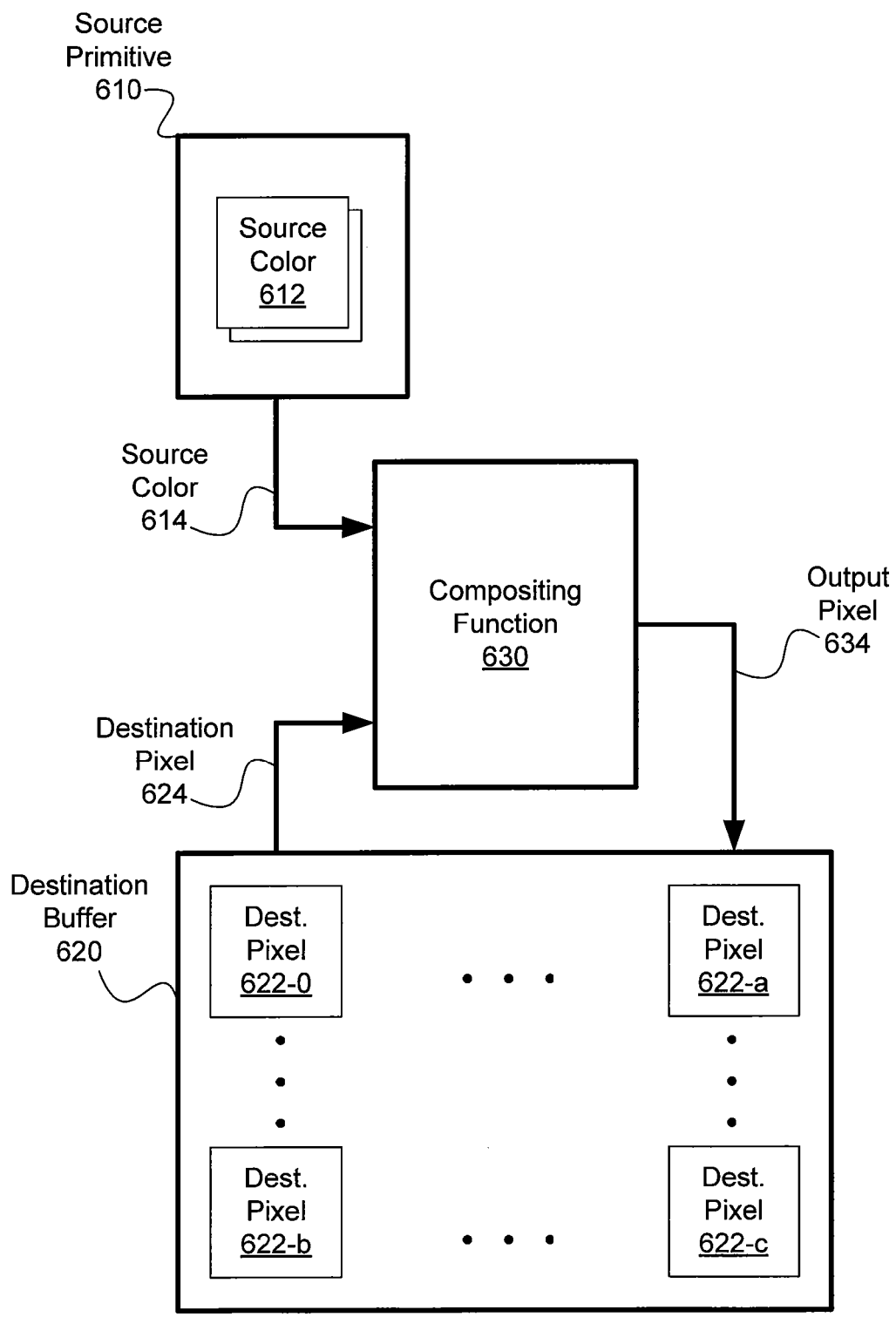
FIG. 6 illustrates compositing from a source color into a destination buffer, according to one embodiment of the present invention.

FIG. 6 illustrates compositing from a source primitive 610 into a destination buffer 620, according to one embodiment of the present invention. The source primitive 610 may comprise any geometric primitive that covers the destination buffer 620 where the source colors are computed through any technically feasible manner of computing color values including programmable shading. In one embodiment, the source primitive 610 is a path object rendered from baked path object data 522. The source primitive 610 may overlap a subset of the number of destination pixels 622 stored in destination buffer 620. A compositing function 630 is configured to receive a source color 614 from the source primitive 610 and a destination pixel 624 encoding a color from the destination buffer 620. The compositing function 630 computes an output pixel 634 from the source color 614 and destination pixel 624. The output pixel 634, which represents a composite of the source color 614 and destination pixel 624, is written over the original destination pixel 624 within the destination buffer 620. Source colors and destination pixels are matched according to corresponding overlap of source primitive 610 with the destination buffer 620. In one embodiment, testing a stencil buffer 530 restricts the overlap of the source primitive 530 to the coverage corresponding to the path object.

In one embodiment of the present invention, the compositing function 630 is implemented by a combined shader program that is configured to execute on a GPU to render the path object by rendering and composite individual source colors 612 with corresponding, previously stored destination pixels 622. Each source color 612 may be computed by the shader program and subsequently composited into the destination buffer 620 via the compositing function 630. In such an embodiment, the source primitive 610 need only generate as many source colors 612 as are currently in flight for compositing. Alternatively, the source primitive 610 for a path object may be rendered into an alternative buffer (not shown) to the destination buffer, and the source colors 612 may then be composited with the destination pixels 622 via the compositing function 630 by sourcing this alternative buffer.

Persons skilled in the art will recognize that a wide range of compositing functions may be desirable, including, without limitation, functions to color dodge, soft light, hard light, darken, lighten, color burn, difference, subtract, exclude, contrast, invert, linear dodge, linear burn, vivid light, hard mix, and so forth. In addition to these compositing functions, any technically feasible compositing function may be implemented without departing the scope and spirit of embodiments of the preset invention.

An exemplary combined shader program is illustrated below in Tables 1-3. A typical shader is illustrated below in the pseudo code of Table 1. As shown, this shader reads texture samples (tex) form a texture map and generates corresponding fragments by modulating the texture samples and a specified color (gl_Color). This particular shading computation is meant as an exemplar for any arbitrary shading computation to compute a color.

TABLE 1

```
varying vec2 texCoord;
uniform sampler2D decalMap;
void main( )
{
        vec4 tex = texture2D(decalMap, texCoord);
        gl_FragColor = tex*gl_Color;
}
```

A linear dodge compositing function is illustrated below in the pseudo code of Table 2:

TABLE 2

```
if ((csrc * adst + cdst * asrc) <= (asrc * adst))
        result = (csrc * adst + cdst * asrc)
else
        result = (asrc * adst + csrc*(1–adst) + cdst*(1–asrc))
```

In this linear dodge compositing function applied for each color component, "asrc" is an alpha component for source pixel 612, "csrc" is a particular alpha pre-multiplied source RGB color component and cdst is an alpha pre-multiplied destination RGB color component.

The combined shader program is illustrated below in Table 3 by a shader program expressed in the OpenGL Shading Language (GLSL):

TABLE 3

```
#extension GL_ARB_texture_rectangle : enable
varying vec2 texCoord;
uniform sampler2D decalMap;
uniform sampler2DRect framebuf;
void main( )
{
        // Original shader:
        vec4 tex = texture2D(decalMap, texCoord);
        gl_FragColor = tex*gl_Color;
        // pre-multiply by alpha:
        vec4 src = gl_Color;
        src.rgb *= src.a;
        // read frame buffer color value:
        vec4 dst = texture2DRect(framebuf, gl_FragCoord.xy);
        // implement compositing function for linear dodge blend:
        gl_FragColor.rgb = mix(
            // when lessThanEqual is false
            src.rgb*dst.a + src.rgb*(1.0–dst.a) + dst.rgb*(1.0–src.a),
            // when lessThanEqual is true
            src.rgb * dst.a + dst.rgb * src.a,
            // Per-component boolean condition
            vec3(lessThanEqual
                (src.rgb * dst.a + dst.rgb * src.a, vec3(src.a * dst.a))));
        gl_FragColor.a = src.a + dst.a*(1.0–src.a);
}
```

As shown, the original functionality of the shader program of Table 1 is reproduced in the combined shader program of Table 3, along with the compositing function of a linear dodge blend function, illustrated in Table 2. The combined shader illustrates a path rendering shader that performs a covering operation that includes shading path object pixels and compositing the shaded path object pixels into destination buffer 620. In one embodiment the destination buffer 620 comprises an image buffer 532 and the decalMap comprises stencil buffer 530. Importantly, the texture sampler accessed by the texture2DRect function is configured to read the destination buffer 620. In conventional GPU rendering, such an access by a shader would result in ill-defined behavior because destination buffer 620 is both an input to the shader program and the program's output as well. Pixel caching, texture pipeline structure, and read-modify-write hazards in pipeline rendering in contemporary GPU architectures would generally produce incorrect compositing results.

Figure 7:
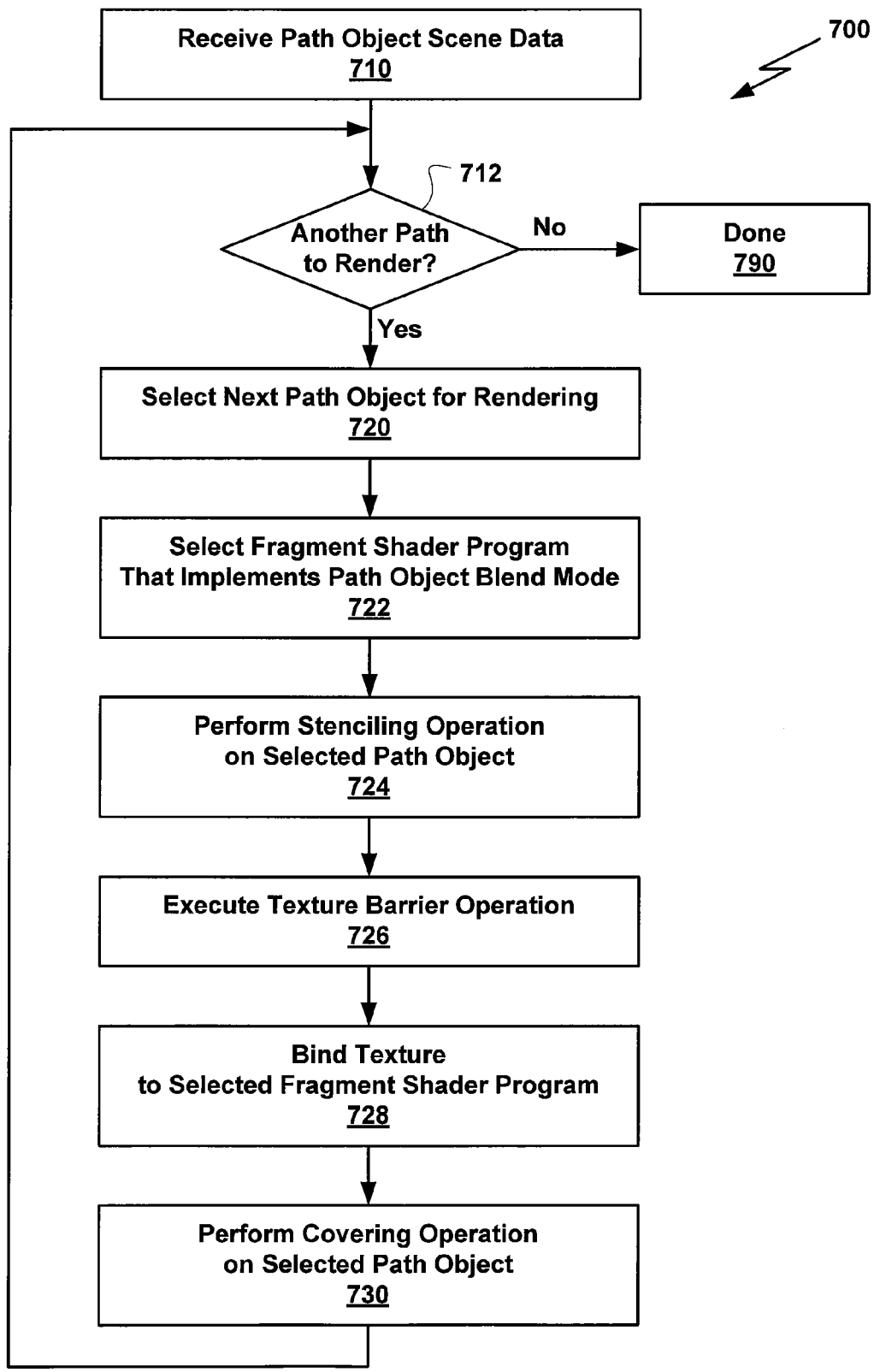
FIG. 7 is a flow diagram of method steps for compositing a rendered path object into a target buffer, according to one embodiment of the present invention.

FIG. 7 is a flow diagram of method steps 700 for compositing a rendered path object into a target buffer, according to one embodiment of the present invention. Although the method steps are described in conjunction with the systems of FIGS. 2A-6, persons skilled in the art will understand that any system configured to perform the method steps, in any order, is within the scope of the present invention.

The method begins in step 710, where a path rendering shading program receives path object scene data. If, in step 712, another path should be rendered from the path object scene data, then the method proceeds to step 720, where a next path object is selected for rendering by the path rendering shading program. In step 722, the path rendering shading program selects a fragment shader program that implements a blend mode for the selected path object, comprising, without limitation, a combined shading program. The selected fragment shader program implements a path object covering operation, and an associated compositing operation for the selected path object. In step 724, the device driver 103 configures parallel processing subsystem 112 to perform a stenciling operation on the selected path object, thereby populating the stencil buffer 530 of FIG. 5 with stencil values. In step 726, the parallel processing subsystem 112 executes a texture barrier operation, which causes GPU caches configured to store texture as well as image buffer data to be invalidated. Such GPU caches may include, without limitation, the uniform L1 cache 375 of FIG. 3C, the L1 cache 320, the L1.5 cache 335 of FIG. 3A, and so forth. Invalidating a texture cache triggers no further action from the texture cache. However, the texture cache is required to re-fetch data that was potentially valid prior to an invalidation command. Invalidating a writeable cache may trigger a write back. While the term "texture barrier" refers to textures, the barrier operates broadly to invalidate cached or pipelined pixel data through the graphics pipeline as textures and images are essentially the same in their memory representation as pixels in memory. In one embodiment, the texture barrier operation is an operation that block subsequent rendering operations until each cache holding or potentially holding values from image buffer 532 is invalidated. In step 728, the image buffer 532 is bound to the selected fragment program for access as a texture map. The image buffer 532 being read by the shader program is the same image buffer 532 to which the path object is to be composited. In an alternative embodiment the destination buffer could be read from the shader program with direct memory reads (loads) rather than texture accesses. In step 730, the selected fragment shader program performs a covering operation on the selected path object. The covering operation may include operations to compute a color and composite the shaded color into a surface, as illustrated by the combined shader program in Table 3. For a composite operation to write the shaded pixel to the surface, the pixel may be required to pass a specified stencil test. For each shaded pixel composited into the surface, a corresponding stencil sample in the stencil buffer is reset, guaranteeing that a given pixel will only be composited once. Upon completing the covering operation, the method proceeds back to step 712.

Returning to step 712, if another path is not needed to be rendered from the path object scene data, then the method terminates in step 790.

In sum, a technique for compositing path color for a path object being rendered by a GPU shader program is disclosed. The technique involves selecting a fragment shader based on a blend mode associated with the path object, performing a stenciling operation for the path object, executing a texture barrier function, and then executing a covering operation on the path object. A destination buffer for compositing is bound to the shader program as a texture map, which enables greater flexibility in processing data within the destination buffer. Data hazards potentially introduced by intervening texture caches are avoided by executing the texture barrier between each stenciling operation and each corresponding covering operation.

One advantage of the disclosed technique is that fully programmable compositing is enabled within a conventional GPU. Fully programmable compositing enables the GPU to perform a complete set of compositing operations required by existing path rendering blend mode standards.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for rendering a first path object, the method comprising:

performing a stenciling operation on the first path object, without tessellating the first path object, to update one or more stencil values associated with at least one pixel that is associated with the first path object;

executing a texture barrier operation to invalidate one or more caches configured to store an image buffer;

performing a covering operation on the first path object to composite a rendered pixel value for the at least one pixel, based on the one or more stencil values, wherein the rendered pixel value comprises a color value; and writing the rendered pixel value to the image buffer.

2. The method of claim 1, further comprising:

receiving a plurality of path objects and a corresponding blend mode specification for each path object included in the plurality of the path objects; and associating a fragment shader program with the first path object included in the plurality of path objects based on the blend mode specification corresponding to the first path object.

3. The method of claim 2, wherein the blend mode specification corresponding to the first path object indicates a specific mathematical function for compositing a source pixel and a destination pixel to generate the rendered pixel value for the at least one pixel.

4. The method of claim 3, wherein the source pixel is generated when the covering operation is performed, and the destination pixel is read from the image buffer.

5. The method of claim 3, wherein the fragment shader program is configured to implement the covering operation as well as the specific mathematical function for compositing the source pixel and the destination pixel.

6. The method of claim 2, wherein the image buffer is bound to the fragment shader program as a texture map.

7. The method of claim 1, wherein a stencil value corresponding to the rendered value for the at least one pixel is reset when the covering operation is performed.

8. The method of claim 1, wherein the texture barrier operation comprises an operation configured to block subsequent rendering operations until after each cache of the one or more caches is invalidated.

9. The method of claim 1, wherein the stencil and cover operations determine the filled or stroked region of the path object.

10. A non-transitory computer-readable storage medium including instructions that, when executed by a processing unit, cause the processing unit to render a first path object, the method comprising:
  performing a stenciling operation on the first path object, without tessellating the first path object, to update one or more stencil values associated with at least one pixel that is associated with the first path object;
  executing a texture barrier operation to invalidate one or more caches configured to store an image buffer;
  performing a covering operation on the first path object to composite a rendered pixel value for the at least one pixel, based on the one or more stencil values, wherein the rendered pixel value comprises a color value; and
  writing the rendered pixel value to the image buffer.

11. The non-transitory computer-readable storage medium of claim 10, further comprising:
  receiving a plurality of path objects and a corresponding blend mode specification for each path object included in the plurality of the path objects; and
  associating a fragment shader program with the first path object included in the plurality of path objects based on the blend mode specification corresponding to the first path object.

12. The non-transitory computer-readable storage medium of claim 11, wherein the blend mode specification corresponding to the first path object indicates a specific mathematical function for compositing a source pixel and a destination pixel to generate the rendered pixel value for the at least one pixel.

13. The non-transitory computer-readable storage medium of claim 12, wherein the source pixel is generated when the covering operation is performed, and the destination pixel is read from the image buffer.

14. The non-transitory computer-readable storage medium of claim 12, wherein the fragment shader program is configured to implement the covering operation as well as the specific mathematical function for compositing the source pixel and the destination pixel.

15. The non-transitory computer-readable storage medium of claim 11, wherein the image buffer is bound to the fragment shader program as a texture map.

16. The non-transitory computer-readable storage medium of claim 10, wherein a stencil value corresponding to the rendered value for the at least one pixel is reset when the covering operation is performed.

17. The non-transitory computer-readable storage medium of claim 10, wherein the texture barrier operation comprises an operation configured to block subsequent rendering operations until after each cache of the one or more caches is invalidated.

18. The non-transitory computer-readable storage medium of claim 10, wherein the stencil and cover operations determine the filled or stroked region of the path object.

19. A computing device, comprising:
  a graphics processing unit (GPU) memory configured to store a stencil buffer and an image buffer;
  a GPU coupled to the GPU memory and configured to:
    perform a stenciling operation on a first path object, without tessellating the first path object, to update one or more stencil values associated with at least one pixel that is associated with the first path object;
    execute a texture barrier operation to invalidate one or more caches configured to store data associated with the image buffer;
    perform a covering operation on the first path object to composite a rendered pixel value for the at least one pixel, based on the one or more stencil values, wherein the rendered pixel value comprises a color value;
    write the rendered pixel value to the image buffer;
    receive a plurality of path objects and a corresponding blend mode specification for each path object included in the plurality of the path objects; and
    associate a fragment shader program with the first path object included in the plurality of path objects based on the blend mode specification corresponding to the first path object.

20. The computing device of claim 19, wherein the fragment shader program is configured to execute as one or more concurrently executing threads on a graphics processing unit.

21. The method of claim 1, wherein the rendered pixel value is written to the image buffer immediately subsequent to performing the covering operation.

22. The method of claim 1, further comprising, after rendering the first path object, causing the one or more caches to fetch the rendered pixel value from the image buffer.

23. The method of claim 1, wherein performing the stenciling operation on the first path object comprises performing one or more point containment operations on the first path object.

24. The method of claim 23, wherein the one or more point containment operations determine whether the samples are inside of a boundary of at least one of a cubic Bézier path segment and a quadratic Bèzier path segment.

* * * * *